US006574675B1

(12) United States Patent
Swenson (10) Patent No.: US 6,574,675 B1
(45) Date of Patent: Jun. 3, 2003

(54) SIMPLE WORKFLOW ACCESS PROTOCOL

(75) Inventor: Keith Swenson, San Jose, CA (US)

(73) Assignee: Netscape Communications Corporation, Mountain View, CA (US)

( * ) Notice: Subject to any disclaimer, the term of this patent is extended or adjusted under 35 U.S.C. 154(b) by 0 days.

(21) Appl. No.: 09/401,557

(22) Filed: Sep. 22, 1999

Related U.S. Application Data (60) Provisional application No. 60/101,910, filed on Sep. 25, 1998.

(51) Int. Cl.[7] .................................................. G06F 9/00
(52) U.S. Cl. ........................................ 709/316; 709/223
(58) Field of Search ............................. 709/219, 310, 709/313, 223, 316, 201; 717/142; 707/10; 700/181; 705/8

(56) References Cited

U.S. PATENT DOCUMENTS

| | | | | |
|---|---|---|---|---|
| 5,930,512 A | * | 7/1999 | Boden et al. ................ | 717/142 |
| 6,041,306 A | * | 3/2000 | Du et al. ........................ | 705/8 |
| 6,065,009 A | * | 5/2000 | Leymann et al. ............. | 707/10 |
| 6,115,646 A | * | 9/2000 | Fiszman et al. ............. | 700/181 |
| 6,148,334 A | * | 11/2000 | Imai et al. .................. | 709/219 |
| 6,308,224 B1 | * | 10/2001 | Leymann et al. ........... | 709/310 |

OTHER PUBLICATIONS

Hollingsworth, David. "The Workflow Reference Model." Workflow Management Coalition, Jan. 19, 1995.*
CoCreate Software et al. "Workflow Management Facility" Jul. 4, 1998.*
"Workflow Client Application (Interface 2) Application Programming Interface (WAPI) Specification". Workflow Management Coalition, May 15, 1996.*

* cited by examiner

*Primary Examiner*—Zarni Maung
*Assistant Examiner*—Gregory Clinton
(74) *Attorney, Agent, or Firm*—Glenn Patent Group; Michael A. Glenn; Kirk D. Wong (57) ABSTRACT

One aspect of the invention provides an HTTP based extensible protocol supporting a subset of the workflow object names and definitions of the OMG workflow protocol. HTTP is a synchronous communication interface. The HTTP based protocol can communicate across the Internet, traversing firewalls. Workflow applications requiring such traversal could then be built and readily integrated into the enterprise side workflow systems built with the OMG workflow protocol and CORBA.

9 Claims, 3 Drawing Sheets

SIMPLE WORKFLOW ACCESS PROTOCOL

This application claims priority and incorporates by reference the provisional application "Simple Workflow Access Protocol" Application No. 60/101,910 by Keith Swenson filed Sep. 25, 1998.

TECHNICAL FIELD

This invention relates to workflow access protocols as used in process management software tools.

BACKGROUND ART

Workflow systems monitor and control activities occurring over an extended period of time and quite possibly over extended distances. It is quite common for such workflow systems to require communication and coordination between more than one computer.

Many previous workflow systems have been built with proprietary tools, including proprietary communication protocols between the interacting computers of the system. While such systems have been able to perform important tasks, there have been substantial problems associated with such systems. Proprietary protocols pose significant difficulties for integration of multiple-vendor tools. Most of these proprietary protocols require specific client viewing/interaction tools for users to access such workflow systems. Proprietary protocols require a separate, often substantial effort to integrate into enterprise class infrastructure environments, such as CORBA.

The OMG (Object Management Group) consortium has sought to provide a standardized workflow access protocol compatible with CORBA (Common Object Request Broker Architecture). While this systems approach has some significant advantages, it has one substantial limitation. The CORBA infrastructure is limited to operation within an enterprise computer environment. CORBA does not reasonably traverse firewalls. As such this approach does not readily support workflow situations which must traverse one or more firewalls, as is the situation in extranet applications, among many others.

The OMG consortium has provided an HTTP-compliant protocol, known as IIOP (Internet Inter-ORB), allowing CORBA based applications to communicate with other CORBA applications in different enterprises. This complex, sophisticated protocol requires a significant development investment to interface smaller applications to such engines. Small business software such as inventory control and purchase tracking systems would suffer a significant expense with such a protocol.

There is an additional problem in these above discussed protocols. Each of them typically requires the invocation of multiple methods of the object class to return the complete state of the workflow object instance. This is not only inefficient, but also leaves open the possibility of the process state changing between retrieval of different parts of the process object instance. What is needed is a protocol retrieving the workflow object-state in its entirety as one operation.

Workflow access protocols such as Simple Mail Transport Protocol (SMTP) can traverse firewalls based upon using email as an access protocol. While such systems can address some of the requirements of workflow beyond one enterprise, the use of email based protocols poses other problems. Email is a non-synchronous communication protocol, which propagates messages by a store and forward procedure. Process management requires synchronization. While techniques to provide synchronization have been built on top of email, these techniques have been very clumsy and unnatural. Such techniques also suffer significant overhead in terms of system response delay, which limits the kinds of workflow applications that can be monitored and controlled.

What is needed is a simple, synchronous access protocol capable of traversing firewalls possessing an infrastructure upward compatible to the OMG workflow protocol supporting CORBA, capable of retrieving the entire state of a workflow object as a single operation.

DISCLOSURE OF THE INVENTION

One aspect of the invention provides an HTTP based extensible protocol supporting a subset of the workflow object names and definitions of the OMG workflow protocol. HTTP is a synchronous communication interface. The HTTP based protocol can communicate across the Internet, traversing firewalls. Workflow applications requiring such traversal could then be built and readily integrated into the enterprise side workflow systems built with the OMG workflow protocol and CORBA.

A further embodiment of the invention incorporates the following objects: An instance of a ProcessDefinition object exists for every process definition input into the system. Its primary function is to create particular process instances (called WorkProcess instances). A WorkProcess represents an instance of a particular process. It will typically be given a unique process instance ID, which is used as part of the URL. The WorkProcess is a way to access the overall process state and to control it at some level. A WorkProcess instance may additionally have active references to WorkActivity instances, which portray which external activities the process is waiting on. A WorkProcess instance may additionally have one or more references to WorkRequester objects to be posted when the current WorkProcess is completed. WorkActivity instances provide a description of the activity being waited on, who is assigned to the activity, and if automated, give a reference to the performer of the activity. A WorkRequester instance is the context object for those WorkProcesses started by some other long-term object. The WorkProcess object can provide the context data for the Workprocess and represents the required object to be informed when the process instance completes.

A further embodiment of the invention incorporates at least one ProcessDirectory object, which is used to search and find ProcessDefinition objects.

A further embodiment of the invention incorporates a directory server which stores, accesses and updates the instances of the above workflow objects as well as the above workflow object definitions. The directory server is URL accessible via HTTP protocols, with each workflow object instance possessing a unique URL incorporating a single URL base address.

A further embodiment uses the LDAP protocols of the Netscape directory server to further facilitate the support of HTTP. Use of LDAP as a storage repository of object definitions supports local replication of object definitions. LDAP directory servers further replicate data, providing an easy way to distribute process definitions and changes to process definitions across large enterprise systems.

A further embodiment of the invention integrates into the HTTP based extensible protocol with the directory server a standardized data encapsulation protocol supporting tag names and data contents for object definitions. The tag names and data contents are upward compatible with the OMG workflow object names and definitions. This is advantageous by allowing straightforward use by many systems tools already supporting the data encapsulation mechanism and further aiding the support of integration of workflow application systems with both internal and external processes and activities. A further embodiment of the invention uses the XML standard for data encapsulation in communication with other workflow engines.

These and other advantages of the present invention will become apparent upon reading the following detailed descriptions and studying the various figures of the drawings.

DETAILED DESCRIPTION OF EMBODIMENTS

Figure 1:
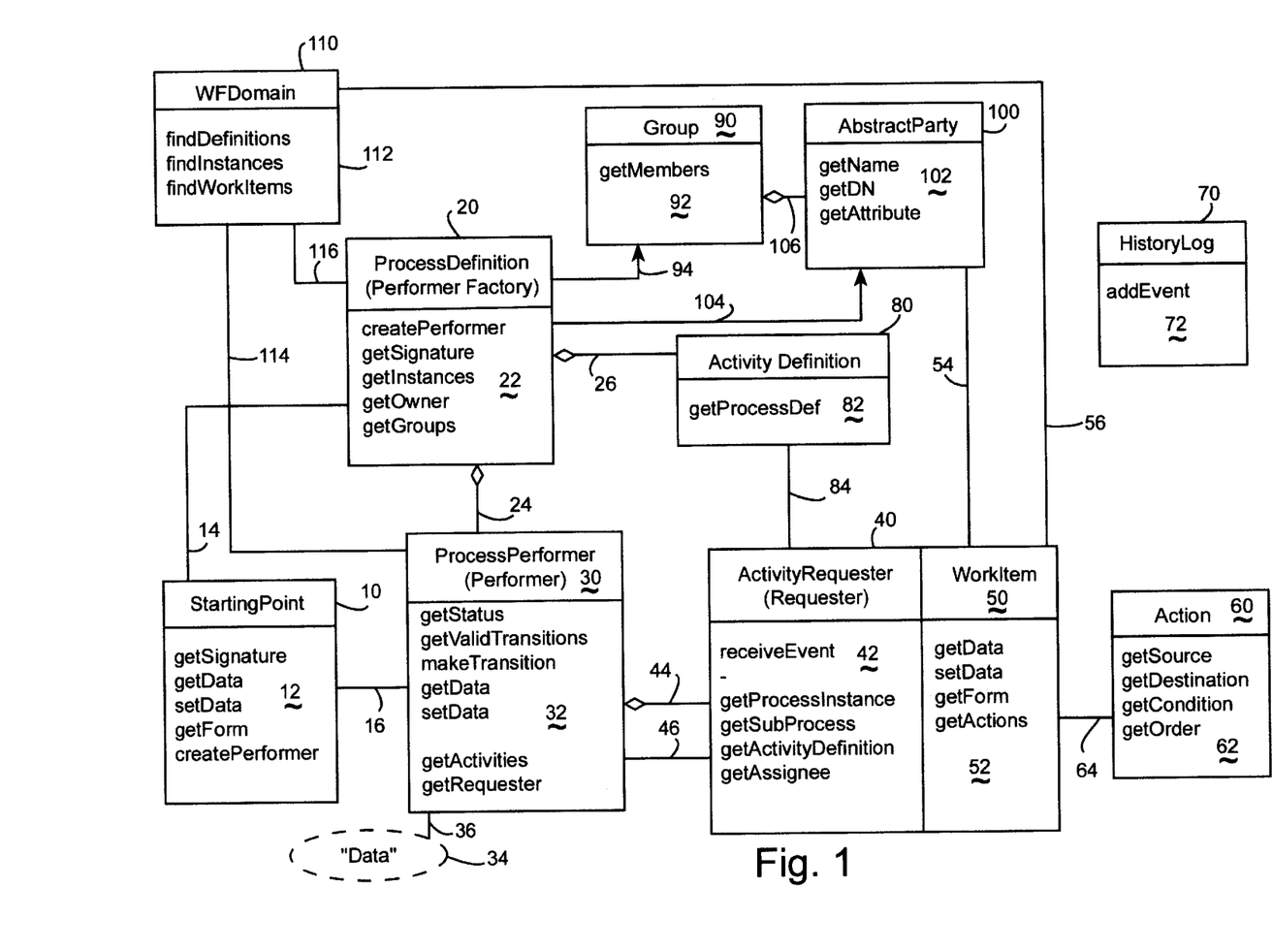
FIG. 1 depicts a workflow object class definition diagram in accordance with certain aspects of the invention.

FIG. 1 depicts a workflow object class definition diagram in accordance with certain aspect of the invention. Note the horizontally divided boxes of this figure. Each of these horizontally divided boxes represents an object class. The upper portion of the horizontally divided box designates one or more names used herein to designate the object class and instances of the object class. Each object shares a number of common methods, which will be discussed shortly, as well as one or more specialized methods. The lower portion of each horizontally divided box lists the specialized methods of that class. These classes and methods will be briefly discussed later in this document and can be found in greater detail in the incorporated by reference provisional application "Simple Workflow Access Protocol" Application No. 60/101,910 by Keith Swenson filed Sep. 25, 1998.

The Simple Workflow Access Protocol (SWAP) provides a simple HTTP based way to access a generic workflow service, or a workflow enabled process, and interoperate with it. The protocol is based on the object model of the OMG Workflow. One chief difference is that being a protocol there is no need for a particular client library on either end, which supports flexibility and small system user application development.

The SWAP protocol is consistent with the HTTP 1.1 extension mechanisms and is the minimal necessary to support basic interoperability between workflow systems. Interoperability as used herein means that a workflow system should be able to start, monitor, exchange data with, and control workflow process instances on a different workflow system.

The SWAP protocol is extensible. The invention defines a minimal functionality needed by almost all workflow systems. High level functionality can be communicated which gracefully degrades to interoperate with systems that do not handle certain extensions. Terseness of expression, or convenience for human readers, is not a goal of this protocol. Ease of generation and parsability are favored over compactness. The workflow system appears externally as a small number of different objects that it must implement or simulate. The object model is consistent with the OMG Workflow model.

Fundamentally, starting a workflow process is a special case of starting a service taking a long time to complete. These interfaces propose a simple generic way to invoke such a service. Since the service takes a long time to complete (e.g. 3 weeks) it is impractical to hold open a network socket, or to use up an operating system thread. Instead, a performer object is created which represents a single invocation of the service. A performer object can be used only once: it is created, then it can be started, it can be paused, resumed, terminated. If things go normally, it will eventually complete. Since each invocation of the service creates a new performer object, one needs a performer factory having a known name in order to create the performers. The performer object knows very little about what invoked it, but it needs a way to communicate when it completes. The performer can be given a reference to a requester object, the only purpose of the requester interface is to provide a way for the process instance to report that it is finished. These terms are not the actual names of the classes or interfaces, but instead represent generic names of relationships between various interfaces.

These relationships form the basis for starting and monitoring long term services. It is anticipated that not only workflow systems, but also many other services will implement these relationships as a way to interface to workflow systems. For example, a company may occasionally need to run a CICS transaction. They have two choices: make a call to the CICS transaction in a proprietary workflow system specific way, or implement this web interface, after which the transaction could be called by any workflow system implementing these interfaces. Note that the accessed service through these interfaces might be a generic long-term service, or it might be a workflow.

Central workflow conceptual components include: ProcessDirectory 110, ProcessDefinition 20, WorkProcess 30, WorkActivity 40, and WorkRequester 40. ProcessDirectory 110 objects are used to search for and find process definitions 20, instances (ProcessPerformers 30) and WorkItems 50.

ProcessDefinition objects 20 play the part of a performer factory. An instance of a ProcessDefinition object 20 exists for every process definition that has been input into the system. The primary function of ProcessDefinition objects is to create instances of a particular process instance (called a WorkProcess 30) using the createPerformer method.

WorkProcess 30 plays the part of a performer 30, also known herein as a ProcessPerformer 30. The ProcessPerformer object 30 represents an instance of a particular process (ProcessDefinition 20). Typically, a process instance will be given by the system a unique process instance ID, which is used as part of the URL. As a performer, this object is a way to access the overall process instance state, and to control it at some level. Some of these will have Activity instances 40, and some will not. A process instance object can be given addresses of Requester objects 40 that they will post to when they complete processing, in order to inform external processes.

WorkActivity 40 plays the part of a requester 40, which is also known herein as an Activity Requester 40. A process instance 30 may have one or more WorkActivities 40 currently active. These show that the process is currently waiting on certain external things to happen. Beyond giving a description of activity being waited on, an activity instance reports who is assigned to the activity, and if automated gives a reference to the performer of the activity.

WorkRequester 40 also plays the part of a requester 40, which is also known herein as an Activity Requester 40. This is the context object for processes started by other long-term objects. The request 40 can provide the context data for the process. It represents an object to be informed when the process instance completes.

Figure 2:
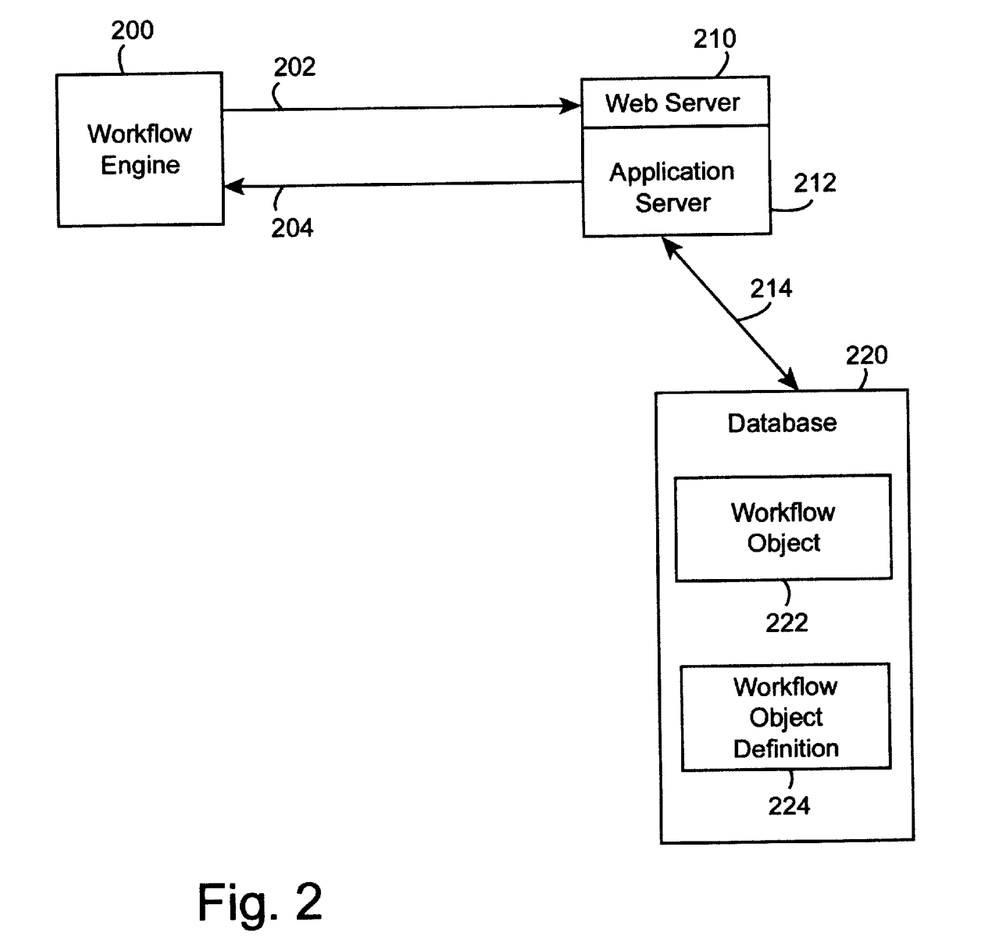
FIG. 2 depicts a basic system application of workflow objects in accordance with certain aspects of the invention.

FIG. 2 depicts a basic system application of workflow objects in accordance with certain aspects of the invention.

Workflow Engine 200 communicates to Web Server 210 as indicated by arrow 202 using the HTTP protocol. Web Server 210 communicates to Workflow Engine 200 as indicated by arrow 204 using the HTTP protocol. Application Server 212 is closely coupled to Web Server 210, sharing the communication of Workflow Engine 200 with Web Server 210. Arrow 214 depicts a coupled database 220 containing at least one Workflow Object Definition 224 and Workflow Object 222.

Further assume that Web Server 210, Application Server 212 and database 220 are internal to an enterprise computing system which maintains a firewall between the enterprise systems and Workflow Engine 200.

This is a common situation which individuals and small to medium size businesses using Workflow Engines 200 frequently encounter in interfacing with larger companies possessing enterprise systems. These users are often extremely interested in tracking processes, including but not limited to the progress of orders, work, services, shipping and delivery schedules, as well as other vital logistically oriented components of the interactive world of business. Workflow processes are at the heart of many such software tools. The OMG workflow system, with its reliance on CORBA is a natural choice for the enterprise side of the system.

These clients must interface to this enterprise system, and they are not interested in large software investments to bring up a CORBA compliant solution. Aspects of this invention provide them a simple, reliable (in part because it is simple) command interface which can be built from HTTP commands, so that their existing software base can be extended at low cost to handle such challenges. HTTP commands have the added advantage of having a large body of trained and experienced software developers who can implement such interfaces.

Figure 3:
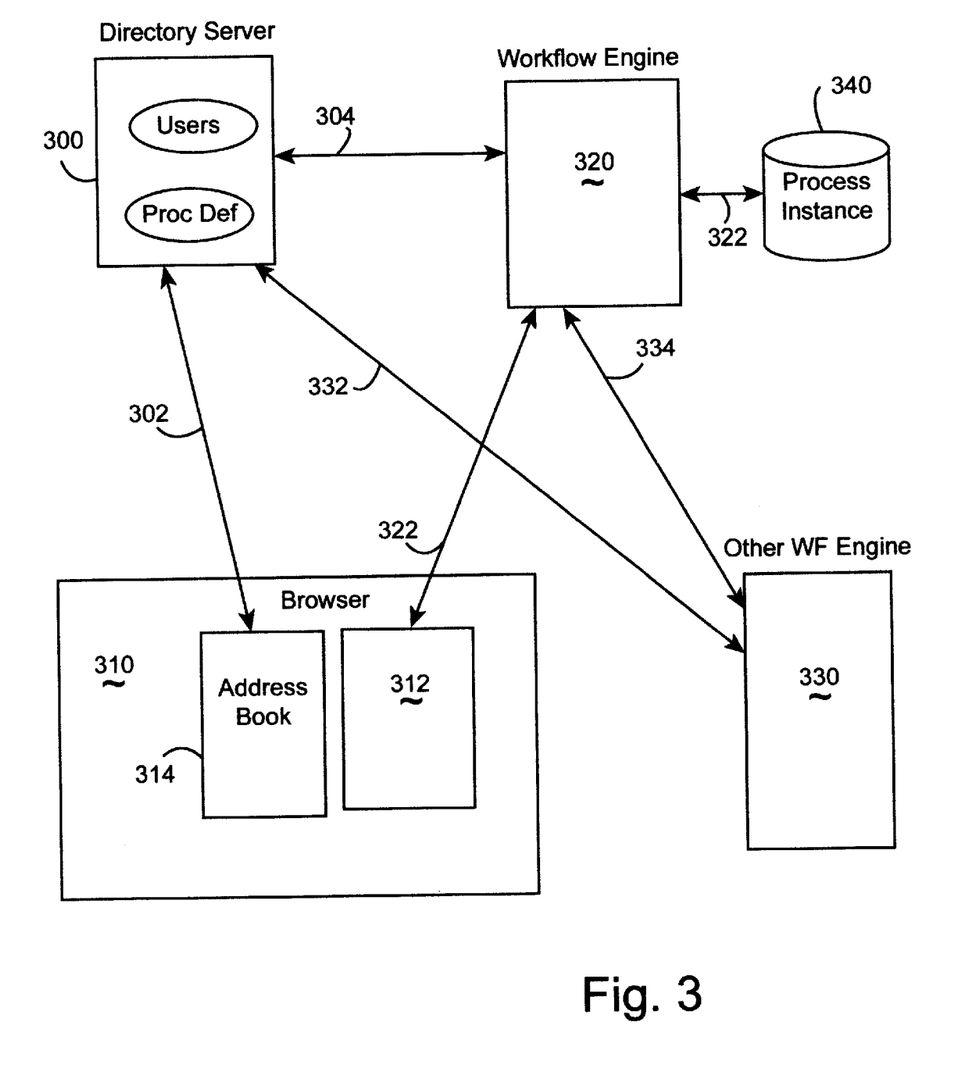
FIG. 3 depicts a more sophisticated system application of workflow objects utilizing the LDAP directory server in accordance with certain aspects of the invention.

FIG. 3 depicts a more sophisticated system application of workflow objects utilizing the LDAP directory server 300.

The LDAP directory server 300 contains the user and process definitions for the workflow system. Arrow 302 depicts bi-directional communication using the LDAP extensions of HTTP between LDAP directory server 300 to a system including a browser 310, which further includes address book 314 and browser window 312. Arrow 304 depicts bi-directional communication using the LDAP extensions of HTTP between LDAP directory server 300 to a system including WorkFlow Engine 320. Arrow 322 depicts bi-directional communication using the LDAP extensions of HTTP as well as HTML between WorkFlow Engine 320 to a system including a browser 310. Arrow 332 depicts bi-directional communication between WorkFlow Engine 320 local storage 340 where Process Instances reside. Arrow 334 depicts bi-directional communication using HTTP as well as XML between WorkFlow Engine 320 to a system including other WorkfFlow Engine 330.

A further embodiment incorporates a directory server 300 which stores, accesses and updates the instances of the above workflow objects as well as the above workflow object definitions. The directory server is URL accessible via HTTP protocols, which each workflow object instance possessing a unique URL incorporating a single URL base address.

A further embodiment uses the LDAP protocols of the Netscape directory server to further facilitate the support of HTTP. Use of LDAP as a storage repository of object definitions supports local replication 340 of object definitions. LDAP directory servers further replicate data, providing an easy way to distribute process definitions and changes to process definitions across large enterprise systems.

A further embodiment of the invention integrates into the HTTP based extensible protocol with the directory server a standardized data encapsulation protocol as used by arrow 334 supporting tag names and data contents for object definitions. The tag names and data contents are upward compatible with the OMG workflow object names and definitions. This advantage allows straightforward use by many systems tools already supporting the data encapsulation mechanism and further aiding the support of integration of workflow application systems with both internal and external processes and activities. A further embodiment of the invention uses the XML standard for data encapsulation in communication with other object on other workflow engines.

URLs

Each object has an URL base address. This URL should be treated as an opaque value so that there are no requirements upon it. In this document the expression "base_address" will be used to indicate this value. The base address might contain some standard URL parameters. For example, a PurchaseOrder process definition URL might be like one of these:

http://myserver.nemo.com/wf/po http://myserver.nemo.com/wf?processDef=po

A particular instance of that process, instance number 54, might be http://myserver.nemo.com/wf/po?instance_id=54 http://myserver.nemo.com/wf?processDef= po&instance_id=54 http://myserver.nemo.com/wf?instance_id=po_54

Within that instance, a particular activity might be http://myserver.nemo.com/wf/po?instance_id= 54&node_id=approve1 http://myserver.nemo.com/wf/po?node_id= approve1&instance_id=54 http://myserver.nemo.com/wf?instance id=po_ 54&node_id=approve1 http://myserver.nemo.com/wf?id=po_54_approve1

These are just examples and are provided by way of illustration and are not to be considered to limit the scope of the invention. The base language of the URL's does not have to be English or even a Indo-European language, such as Gaellic, French, German or Russian. The language involved could be from any written language with a standardized character set used in network communication, including but not limited to Japanese, Korean, Chinese, as well as languages from Africa, the Americas and elsewhere.

A given embodiment of the invention has complete control over how it wishes to create the URL that names the object. It uses a single method of producing these URL names, so that the names can serve as a unique identification for the object involved. Thus while multiple examples are given for a particular object above, a given embodiment should only ever produce one of the values, and should expect to receive only one. The receiving program should treat it as an opaque value and not assume anything about the format of the URL.

Parameters

The base URL is then extended in a standardized way. The following parameters are part of the standard. For a particular command, some are required, some are optional, and some are ignored. The position of the parameters is not significant in http, but the names are significant. This API keeps the data types for a parameter name consistent; if a parameter name is used in more than one command, then the data type will be the same in all commands.

A minimum set of parameter names includes: command, requester, filter, transition, participant and priority. The command parameter is an identifier that specifies the "method" that you are calling on the interface. The actual values for commands are listed below for each of the objects. The requester parameter is the URL for events to be posted back to. The filter parameter is a condition that can be used as a where clause of a SQL query. The transition parameter is the name of a transition. The participant parameter is the distinguished name of a person or other directory entry. The priority parameter is an integer priority value.

Part of standard http protocol includes the name and password of the person making the request. It is assumed that this is used to authenticate the user, and that the user name is available to the routines that are doing the processing.

Returned Values

The result of any http operation is a text document coming back to the originator. That document can have a standard mime type specified in the header of the message back. Two options for the encoding of this data include returning data as an XML encoded object tree, or alternatively, encoding the data using HTML and TABLE tags.

In both cases the data to be returned can be represented as a tree structure. At the top level there is a collection of name/value pairs. In some cases, the value itself is a keyed list (a list of name value pairs). If the value is a straight list of values, then the index number into the list is used as a "name" for the purpose of this transport.

XML Encoding

Data to and from the server is encoded in XML syntax. The data is represented as a tree of objects. Each node of the tree has any number of named attributes. The value of an attribute may be a simple value, or may be another node with more attributes.

That tree of objects is encoded into tags with the tag name being the attribute name, and the value of the attribute between the start and end tags. Here is the same example:

```
<RESULT>
    <OBJECT_TYPE>WorkProcess</OBJECT_TYPE>
    <URL>http://myServer/app1?proc=889</URL>
    <STATES>
       <ITEM>open.notRunning</ITEM>
       <ITEM>open.running</ITEM>
    </STATES>
    <STATUS>open.notRunning</STATUS>
    <CONTEXT_DATA>
    <ITEM><NAME>city</NAME><VALUE>San Francisco<NALUE></ITEM>
    <ITEM><NAME>state</NAME><VALUE>California<NALUE>
    </ITEM>
       </CONTEXT_DATA>
</RESULT>
```

Custom tags will be invented for the known fixed attributes associated with standard objects. XML gives you the ability to define new tags on the fly, and the parser can take those definitions in and extend the parser so that it can actually enforce the syntax as you define it.

HTTP Encoding

An alternative, and optional, encoding simply uses nested two column tables to represent the data. The first column is the attribute name, and the second column is the value. If the value is an object, then it too becomes a two column table of attributes and values. The overhead can be relatively low since in the very worst case it only takes 34 bytes extra per name/value pair.

HTML encoding should only be returned from a server if the request to the server was in HTML encoding.

```
<TABLE>
   <TR><TD>ObjectType</TD><TD>WorkProcess</TD></TR>
   <TR><TD>url</TD><TD>http://myServer/app1?proc=889</TD></TR>
   <TR><TD>states</TD><TD><TABLE>
      <TR><TD>0</TD><TD>open.notRunning</TD></TR>
      <TR><TD>1</TD><TD>open.running</TD></TR>
      </TABLE>
   <TR><TD>status</TD><TD>open.notRunning</TD></TR>
   </TABLE>
```

In either case, the HTTP based protocol differs from the IDL/IIOP protocol because since requests have a fairly heavy impact, the emphasis is on including more information in a single call. In some cases where the OMG Workflow spec would include a set of methods for retrieving individual values from an object, it is far more efficient to retrieve all values from the object in a single request. For this reason all objects have a getInfo method returning all of the object properties in a single call.

There are cases where an OMG Workflow function might return an iterator across a collection of object references. This is done to eliminate the need to make a request to get information on each of the objects in the collection.

SWAP includes a certain amount of basic information about the object along with the URL. For example, a request for a list of object instances includes not only the URL (which is useful for doing getInfo with) but also the name, description, priority, etc. of the process instance. What this means is that in the initial listing you retrieve partial information about an object. To get the complete information about an object the getInfo request is performed for that object.

There is no limit on the size of the result information for a particular request and there is no support in the protocol for retrieving a partial result allowing for the retrieval of the next piece of the result later. Each operation on the service is complete and does not require any session state to be kept on the server.

In all operations there is an optional return value for the exception. This will generally be null or empty. The presence of a value will indicate that the operation did not complete successfully, and will contain a description of what when wrong. The description should not be assumed to be a simple string value, but is most likely to be a complex value created by combining several strings together. For translation purposes it is desirable to leave the message part of the exception separate from the data of the exception. It is assumed that some basic level of functionality can be obtained by displaying the raw exception message to the user.

Primitive Types

The OMG Workflow spec defines some primitive data types. These are all represented as strings in SWAP. Here is the mapping from OMG Workflow types to SWAP types: wfName is a string, and in SWAP it is a string. State is a string consisting of a series of identifiers separated by periods. wfKey is a string which conforms to the URL naming conventions. Keys in SWAP are always globally unique.

Whenever a system communicates an URL even though multiple forms may exist that would be usable in a HTTP request reach the same object, it must use a single form of the URL so that comparisons can be used between URL to determine if they point to the same object. Every object returns the canonical URL (the key) as a response to the getInfo command.

All WfObjects implement a getInfo command that combines together all of the common "get property" methods described in the OMG Workflow submission. The rationale is that a request to get information is already heavy by the nature of http requests. When this method is called the returned attributes include the above attributes, as well as attributes specified on the actual derived object, as well as optional attributes. As in any method call, the minimum required attributes are listed above, but additional attributes may be present.

The getInfo method returns a state, the states, the transitions, the key, the name, a description and possibly an exception. State is a string value following the WfMC state values convention. States is a collection of possible state values allowed by this object. Transitions is a collection of transitions where each transition consists of a name, startState, endState and a boolean is Controllable.

The key is the proper URL of this object. This is a globally unique URL for each object. It is the one preferred URL for the object.

The name attribute holds a human readable identifier of the workflow object. The name of a workflow object is unique within the scope of its parent.

The description is a longer description of the instance of the object class: the name of the type of object, such as WorkProcess, or WorkActivity, etc.

The exception, if present, makes the above returned values empty.

All WfObject implement setInfo and allow as parameters all of the settable properties. This is an abstract interface, and the objects that implement this interface may have other properties that can be set in this manner. All of the parameters are optional, but to have any effect at least one of them must be present. Subclasses will naturally allow for more attributes to be set. This returns the complete info for the object, just as the getInfo command does, which will include any updated values.

The setInfo command can be used to set at least the displayable name, the description, or the priority of a workflow object. Parameters include name, description and priority. The name is optional, the new name for this workflow object. The description is optional, the new description of the workflow object. The priority is optional, the new priority. Results include returning the same thing as the getInfo command for the object and possibly an exception.

The setInfo command further replaces setName, setDescription, setState, and setPriority from the OMG Workflow proposal. The parameters include name, description and state. The name is optional, holding a human readable identifier of the workflow object. The name of a workflow object is unique within the scope of its parent. The description is optional, a longer description of the instance of the object. The state is the new state to change to. The state is specified as a string, which must be one of the allowed states of the object.

The command make Transition changes the state of the workflow object through use of a named transition. The transition must be specified by name and must be one of the transitions from the list of allowable transitions. The parameters include a transition, the name of the transition to make. The results include the new state as a result of the command and possibly an exception.

All WfObjects can be destroyed by use of the destroy command. This command, like all commands, is subject to internal rights and capabilities. Parameters include an optional reason provided by the caller describing a reason that the object is being destroyed. Results may include an exception.

Since the getHistory method results are potentially lengthy, it is not included in the getInfo command results. Instead it must be retrieved through the use of this command. Parameters include a filter and filterType. The filter condition is applied to the set of history items. If the filter is missing, then all history items that pertain to this WfObject will be returned. The filterType is a value that indicates what language the filter is expressed in. Results include a history composed of a list of event objects and possibly an exception.

Each event object contains the following components: timestamp, eventCode, eventType, responsible, sourceKey, sourceName, containerKey, oldState, newState, transition, changedData, changedRole, participants and possibly exception.

The timestamp is UTC time of the event. The eventCode is an integer event code value. The eventType is a human readable description of the type of the event; for event codes in the reserved range the value of this attribute is 'WfMF'. The responsible component is the distinguished name of the participant that caused the event. The sourceKey component is the URL of the object that the event is referring to. The sourceName component is the user friendly name of the source object. The containerKey component is the URL of the containing object, if any. The oldState component is, if this was a state change event, then this is the old state. The newState component is, if this was a state change event, then this is the new state. The transition component is, if this was a state change event, the name of the transition taken. The changedData component is, if this was a datachanged event, a collection of name/value pairs that represent the data items that were changed. The changedRole component is, if this was a ParticipantChangedEvent event, the name of the role that changed. The participants component is, if this was a ParticipantChangedEvent event, the resulting list of distinguished names of the participants of the role. The exception may optionally include the HistoryNotAvailable exception if access to history information is not supported for the specific workflow object.

A list of valid event codes is defined for work processes, work activities and work items respectively. One or more event codes may be reserved in certain embodiments. Vendor specific extensions may use event codes outside of that range.

All WfObject workflow objects implement the following states: The open.notRunning.notStarted state: A workflow object is in notStarted state when it has not yet actively participated in the enactment of a work process. The open.notRunning.suspended state: When a workflow object is suspended, no workflow objects contained in this element may be started. open.running state: In this state a workflow object is performing its part in the overall execution of the workflow process. The closed.completed state: When a workflow object has finished its task in the overall workflow process it enters the completed state; it is assumed that all workflow objects contained in that element are completed when it enters this state. The closed.terminated state: Execution of a workflow object may be terminated before it completes its task. It is assumed that all workflow objects contained in this element are either completed or are terminated when it enters this state. The closed.aborted state: A workflow object may be aborted before it completes its task (or even before it ever started performing its task). No assumptions on the state of workflow objects contained in this element are made when it enters this state.

Comparison to OMG Workflow

The getInfo command replaces the getName, getKey, getDescription, getstate, listValidStates and listValidTransitions commands of the OMG Workflow proposal. This interface introduces the addListener and removeListener which are not present in OMG Workflow. The setInfo method replaces the setName, setDescription, setState and setPriority.

Communications Interface to WorkRequester

This is an abstract interface for objects that can request work to be done, and can receive events of their status changes. Listed herein are commands specific to the WorkRequester 40 object methods 42.

Command: getInfo

Parameters include contextDataAttributes and performer. The contextDataAttributes parameter is optional and specifies a list of attributes desired for inclusion in the result set. The performer parameter is the URL of a process that is performing this work, if it exists.

Results include contextData and possibly an exception. Any object implementing the work requester interface must return the context data, which is a collection of name value pairs, which are process attributes. The distinction between the context and the instanceData is that the context may have shifts in the names of the attributes to accommodate the sub process. The context is in the schema defined by the sub-process. The exception, if present, renders the above values empty.

Note that the implementation of an object may cause it to return other values as well. getInfo always returns the union of all the properties specified by all the interfaces that the object implements. The property above is a minimum set.

The complete command signals to the requesting object that the started process has completed its task, and will no longer be processing. There is no guarantee that the object will persist after this point in time.

Command: complete

Parameters include resultData, a collection of name/value pairs that represent the final set of data as of the time of completion. Results includes a possible exception, which if present, renders the above values empty.

The terminate command allows a subprocess to communicate that it is abnormally ended for any of a number of reasons. The reason for the termination is passed as a parameter, but this is a descriptive value much like the exception values. The object is not guaranteed to exist after this call.

Command: terminate

Parameters include the reason that the process was terminated prematurely. The result may include an exception, which if present, renders the above values empty.

A subprocess can communicate changes in the data back to the parent requester object before the time of completion by using the following command, in order to keep the attribute values of the two processes synchronized.

Command: setResult

Parameters include resultData, a collection of name/value pairs that represent the final values of these attributes according to the schema defined by the subprocess. Results optionally include an exception, which if present, renders other values empty.

The performer communicates to the requester via events. This is the method that is used to gives the other object the event.

Command: receiveEvent

Parameters include an eventObject further containing a number of parameters, which may be extended by systems. These include timestamp, eventCode, eventType, sourceKey, sourceName, containerKey, oldState (optional), newState (optional), transition (optional), changedData (optional), role (optional), and participants (optional).

The timestamp parameter is the UTC time that the event fired. The eventType parameter is one of an enumerated set of values to specify event types. The oldState parameter is (optional) for a state change event, and is the original state. The newState parameter is (optional) for a state change event, and is the new state. The transition parameter is (optional) for a state change event, and is the transition that was used. The changedData parameter is (optional) for a data changed event, and is the data that has changed, as a list of items each containing a name and a value. The role parameter is (optional) for a role changing event, and specifies the role. The participants parameter is optional, a list of participants that are now assigned to the role.

Results include possibly an exception, which if present, renders the above values empty.

Communications Interface to WorkProcess

This is an interface for all objects that can perform asynchronous actions, particularly process instances in a workflow system.

Command: getInfo

Parameters include resultDataAttributes, which is an optional list of field names to specify which of all the result values are to be returned. If this is empty or missing then all result data values are included.

Results include the values required by the WfObject, definition, containees, resultData, priority and possibly an exception. The definition parameter is the URL of the process definition object. The containees parameter is a list of records containing for each active activity in the process: the URL of the active activity, the name, the status, the original requester URL that started the process. The result-Data parameter includes a set of name value pairs that represents the current result values as a list of items each containing a name and a type. The priority of a Work Process defines its relative importance. Smaller values indicate lower importance; default value is 0. The exception, if present, renders the above values empty.

Command: setInfo

Parameters include optional values from the WfObject, priority (optional), and contextData (optional). The contextdata optional parameter is a collection of name value pairs that represent the context of this WorkProcess. The names of the fields are from the schema defined by this object. The context is considered the union of the previous context and these values. A partial set of values (e.g. a single name value pair) can be used to update just those fields in the partial set having no effect on fields not present in the call. A list of items includes a name and a type.

Results include returning the same thing that getInfo returns.

If the process is created without the start option, then this command must be used to start the process going. This is a shortcut for setStatus("open.running").

The following command (typically from a requester) is used to terminate a process.
Command: terminate Parameters include the reason that the process was terminated prematurely. The result may include an exception, which if present, renders the above values empty.

The following is a way for other implementations of the Requester interface to register themselves to receive events about changes in process instance status. At this point all events are delivered to all objects that register in this manner. Not all WorkProcess objects will support this; those that do not will return an exception value that will explain the error.
Command: addListener Parameters include requester. The requester parameter is an URL to an object that both implements the requester interface and will receive the events. Results optionally include an exception.

The following is the opposite of the addListener command. Objects removed from being listeners will no longer get events from this object.
Command: removeListener Parameters include requester. The requester parameter is the URL of the object to be removed from the listeners list. This must match exactly to an URL already in the list; if it does, then that URL will be removed; if not, then there will be no change to the process instance. Results include an exception, if any.
Comparison to OMG Workflow This interface introduces the addListener and removeListener, which are not present in OMG Workflow. getInfo replaces the following methods: getPriority, listContainees, getDefinition, and getResult. setInfo replaces the following methods: setPriority.
Communications Interface to ProcessDefinition Another interface for objects that can create WorkProcesses 30.
Command: getInfo There are not parameters. Results include items defined by WfObject, contextdataInfo, resultDataInfo, and possibly exception. The contextdataInfo results include meta-data information about expected name values pairs to be put into this process at start time as a list of items, each item including a name and a type. The resultDataInfo results include meta-data information about what name values pairs are expected to be returned by this process upon completion as a list of items, each item including a name and a type. The exception, if present, renders the above values empty.

Given a process definition object, the following command creates instances of that process created. There are two modes: create the process, with data, and start it immediately; or just create it and put the data on it and start it manually.
Command: createWorkProcess Parameters include requester, name, contextData and startImmediately. The requester parameter is the URL to the WorkRequester object. If present, then the process instance is expected to report status changes, especially the transition to completed status, to this object. The name parameter is the name of the process instance to create. The contextData parameter is a optional collection of name/value pairs, each including a name and a value. The startImmediately optional parameter is a boolean "yes" or "no" that specifies whether the newly created process should be started immediately. If not started, then the process is in an "initial" state, and you have to call the start operation on it. Default is "no".

Results include a key and possibly an exception. The key result is the URL of the new WorkProcess object that has been created. The exception, if present, renders the above values empty.
Command: listRealizations Parameters include filter and filterType. The filter parameter is a filter to specify what kinds of work process objects are desired. The filterType parameter is a value that indicates what language the filter is expressed in.

Results include realizations and possibly exceptions. The realizations results include a list of values each containing a key, name and priority. The realization item key is a URL of the WorkProcess object. The realization item name is the display name. The exception, if present, renders the above values empty.

Note that getInfo replaces getContextInfo and getResultInfo in the OMG Workflow.
Communications Interface to WorkActivity This is an activity instance.
Command: getInfo There are no parameters. Results include all the items defined by WfObject, performer, container, priority, contextData, assignees and possibly exceptions. The performer results include, it the activity has a performer (subprocess) associated with it, then the URL of the performer is listed here. The container results include the URL of the WorkProcess object, which contains this work activity. The priority result is like the priority on a WorkProcess. The contextData result include the data as appropriate for this activity as a list of items each containing a name and a value. The assignees results include a list of distinguished names of the person or people assigned to this WorkActivity.
Command: setInfo Parameters include the optional parameters from WfObject, priority and resultData. The priority parameter is the priority of the work process. The resultData parameter is the data that resulted from the activity as a partial set of the data expressed as a list of items each including a name and a value. Results include the same results as getInfo as well as possibly an exception.

The following command is how the workflow system is told that a work item has been completed.
Command: complete Parameters optionally include resultData. The resultData parameter is a set of name value pairs that represent the result value of this work as a list of items each including a name and a value. Results optionally include an exception, which if present, renders the above values empty.
Command: reassign Parameters include assignees as a list of distinguished names for people assigned to this WorkActivity. Results optionally include an exception, which if present, renders the above values empty.
Communications Interface to ProcessDirectory The ProcessDirectory is the highest level interface to the ability to search for workflow definitions, instances, and workitem. This is the starting point for most interactions with the workflow system.
Command: listProcessDefinitions Parameters include filter and filterType. The filter parameter determines what, specifically, is to be returned. The exact format of the query is left to the workflow system. If the filter is left empty or omitted, then here is what a particular user will get for a process definition: all process definitions that user is allowed to access. For a process instance: all process instances that user has started. For a workitem: all workitems currently assigned to user. The filterType parameter is a value that indicates what language the filter is expressed in.

Results include result, key, name, description and possibly exception. The result is a list of structures. The key is the URL to the object. The name is the human readable description. The description is a longer description. The exception, if present, renders the above values empty.

Command: addProcessDefinition

Parameters include key, name and description. The key parameter is the URL to the object to add to the registry. The name parameter is the human readable description. The description is a longer description. Results possibly include an exception, which if present, renders the above values empty.

Command: removeProcessDefinition

Parameters include a key, which is the URL to the object to remove. Results possibly include an exception, which if present, renders the above values empty.

Command: getHistory

Parameters include filter and filterType. The filter parameter is the filter condition to be applied to the set of history items. If the filter is missing, then all history items that pertain to this WfObject will be returned. The filterType parameter is a value that indicates what language the filter is expressed in.

Results include a history and possibly an exception. The history results in a list of event objects. Each event object contains: timestamp, eventCode, eventType, responsible, sourceKey, sourceName, containerKey, oldState, newState, transition, changedData, changedRole, participants and possibly exception.

The timestamp includes UTC time of the event. The eventCode includes an integer event code value. The eventType includes a human readable description of the type of the event; for event codes in the reserved range the value of this attribute is 'WfMF'. The responsible includes the distinguished name of the participant that caused the event. The sourceKey includes the URL of the object that the event is referring to. The sourceName includes the user friendly name of the source object. The containerKey includes the URL of the containing object, if any. The oldState includes, if this was a state change event, then this is the old state. The newState includes, if this was a state change event, then this is the new state. The transition includes, if this was a state change event, the name of the transition taken. The changedData includes, if this was a dataChanged event, a collection of name/value pairs that represent the data items that were changed. The changedRole includes, if this was a ParticipantChangedEvent event, the name of the role that changed. The participants includes, if this was a ParticipantChangedEvent event, the resulting list of distinguished names of the participants of the role. The exception, if present may further include the HistoryNotAvailable exception if access to history information is not supported for the specific workflow object.

Because history is potentially lengthy, it is not included in the getInfo command results. Instead it must be retrieved through the use of this command.

This command getElement from the OMG Workflow is not needed in SWAP because the keys are URLs, and getInfo request can be used to get more information about the object itself.

The preceding embodiments have been provided by way of example and are not meant to constrain the scope of the following claims.

What is claimed is:

1. An HTTP based extensible protocol supporting a subset of the workflow object names and definitions of the OMG workflow protocol supporting process object each including a process state, comprising:

an instance of a ProcessDefinition object for each defined process including a method to create at least one WorkProcess instance of said defined process; and each of said WorkProcess instances may have active references to at least one WorkActivity instance providing a description of external activities for which said WorkProcess instance is waiting;

wherein each of said workflow object classes include a getInfo method which in each instance of a workflow object class returns all information contained in said instance of said workflow object class;

wherein said getInfo method of each of said workflow object classes returns a collection for an instance of said workflow object class comprising a states collection of at least one acceptable state value of said workflow object;

an instance_state belonging to said states collection;

a transition collection comprising at least one transition;

a key representing a URL referencing said workflow object class instance;

a name of said workflow object class instance; and a class_name of said workflow object class of said workflow object class instance; and wherein each of said transitions of said transition collection further comprises a transition_name, a startState, an endState, and an is Controllable flag.

2. An HTTP based extensible protocol supporting a subset of the workflow object names and definitions of the OMG workflow protocol supporting process object each including said process state as recited in claim 1 wherein said getInfo method of each of said workflow object classes returns a collection for an instance of said workflow object class further comprises an optional exception result, which if present, makes the other returned values empty.

3. An HTTP based extensible protocol supporting a subset of the workflow object names and definitions of the OMG workflow protocol supporting process object each including said process state as recited in claim 1 wherein each WorkProcess object includes a getData method to access said process state; and a setData method to control said process state.

4. An HTTP based extensible protocol supporting a subset of the workflow object names and definitions of the OMG workflow protocol supporting process object each including said process state as recited in claim 1 wherein each WorkActivity object includes a getAssignee method which protrays assignee of said WorkActivity object instance.

5. An HTTP based extensible protocol supporting a subset of the workflow object names and definitions of the OMG workflow protocol supporting process object each including said process state as recited in claim 1 wherein each WorkActivity includes a getProcessInstance method which provides a reference to a performer of said WorkActivity instance whenever said performer of said activity is automated.

6. An HTTP based extensible protocol supporting a subset of the workflow object names and definitions of the OMG workflow protocol supporting process object each including said process state as recited in claim 1, further comprising:

wherein each WorkProcess instance may have references to at least one WorkRequester object to be posted when said current WorkProcess is completed; and wherein a WorkProcess object method named getactivities provides active WorkRequester references.

7. An HTTP based extensible protocol supporting a subset of the workflow object names and definitions of the OMG workflow protocol supporting process object each including said process state as recited in claim 6 wherein each WorkRequester instance is the context object for each WorkProcess started by some other long-term object.

8. An HTTP based extensible protocol supporting a subset of the workflow object names and definitions of the OMG workflow protocol supporting process object each including said process state as recited in claim 6 wherein each WorkRequester instance of said WorkProcess object can provide context data for a Workprocess object.

9. An HTTP based extensible protocol supporting a subset of the workflow object names and definitions of the OMG workflow protocol supporting process object each including said process state as recited in claim 6, further comprising:

an WFDomain object class instance including
  a findDefinitions method which returns references to all of said ProcessDefinition instances of said defined processes;
  a findInstances method which returns references to all of said WorkProcess instances;
  and a findWorkItem.

* * * * *